(12) United States Patent
Dunn

(10) Patent No.: US 8,004,798 B1
(45) Date of Patent: Aug. 23, 2011

(54) HIGH BANDWIDTH FLEXURE FOR HARD DISK DRIVES

(75) Inventor: Christopher Gene Dunn, Austin, TX (US)

(73) Assignee: Magnecomp Corporation, Murrieta, CA (US)

( * ) Notice: Subject to any disclaimer, the term of this patent is extended or adjusted under 35 U.S.C. 154(b) by 422 days.

(21) Appl. No.: 12/397,496

(22) Filed: Mar. 4, 2009

Related U.S. Application Data

(60) Provisional application No. 61/040,895, filed on Mar. 31, 2008.

(51) Int. Cl.
*G11B 5/48* (2006.01)

(52) U.S. Cl. ............... 360/245.8; 360/234.5; 360/245.9; 360/264.2; 360/266.3

(58) Field of Classification Search ............... 360/245.8, 360/245.9, 246, 234.5, 264.2, 266.3
See application file for complete search history.

(56) References Cited

U.S. PATENT DOCUMENTS

| | | | |
|---|---|---|---|
| 4,816,967 A | 3/1989 | Landis | |
| 5,028,983 A | 7/1991 | Bickford et al. | |
| 5,608,591 A | 3/1997 | Klaassen | |
| 6,046,886 A * | 4/2000 | Himes et al. | 360/245.9 |
| 6,295,183 B1 | 9/2001 | Nuno et al. | |
| 6,353,515 B1 * | 3/2002 | Heim | 360/245.9 |
| 6,404,595 B1 * | 6/2002 | Iwamoto | 360/245.9 |
| 6,414,820 B1 * | 7/2002 | Coon et al. | 360/245.9 |
| 6,424,500 B1 * | 7/2002 | Coon et al. | 360/245.9 |
| 6,891,700 B2 | 5/2005 | Shiraishi et al. | |
| 6,900,967 B1 | 5/2005 | Coon et al. | |
| 7,110,222 B2 | 9/2006 | Erpelding | |
| 7,403,357 B1 | 7/2008 | Williams | |
| 7,781,679 B1 * | 8/2010 | Schreiber et al. | 174/254 |
| 2007/0230059 A1 | 10/2007 | Ota et al. | |

* cited by examiner

*Primary Examiner* — Tan T. Nguyen

(74) *Attorney, Agent, or Firm* — Intellectual Property Law Offices of Joel Voelzke, APC

(57) ABSTRACT

A disk drive flexure has a pattern of voids in the ground plane in the area directly underneath the read and write bond pads, in order to adjust the respective impedances of the read and write bond pad pairs to match the impedances of the read and write transducers and the signal trace pairs to and from the transducers. The resulting impedance matched bond pads increase the effective signal bandwidth of the flexure and its electrical connections, decreasing the probability of error at high signal speeds and increasing the maximum data rate through the suspension.

20 Claims, 4 Drawing Sheets

HIGH BANDWIDTH FLEXURE FOR HARD DISK DRIVES

CROSS-REFERENCE TO RELATED APPLICATIONS

This application claims priority from U.S. Provisional Patent Application No. 61/040,895 filed Mar. 31, 2008.

BACKGROUND OF THE INVENTION

1. Field of the Invention

This invention relates to the field of disk drives, and in particular to the field of high bandwidth flexures for hard disk drive drives.

2. Description of Related Art

A disk drive generally uses one or more spinning storage disks, sometimes called storage media, to store data. Disks can be rigid, as used in hard drives, or flexible, as used in floppy drives. Disks commonly store data using magnetic methods or optical methods, and can spin at rates exceeding 15,000 revolutions per minute (rpm). Hard disk drives generally employ several rigid disks stacked one on top of another with spaces in between, attached to a common spindle. Floppy disk drives generally employ a single flexible disk in a bonded sleeve.

Over the surface of each disk in a disk drive, commonly on both sides of each disk, a read-write head is suspended in close proximity to the disk surface by a disk drive suspension. A disk drive suspension is sometimes referred to as a disk drive head suspension or simply a suspension. In hard disk drives with multiple disks on a spindle, suspensions operate in the spaces between the disks and on the two outer disk surfaces. A suspension is a cantilever beam-like feature, mounted on a movable actuator arm. The suspension extends to a precise but variable location above a disk. A suspension typically includes a mounting region, a hinge, a load beam, a gimbal, and a flexure.

The combination of a suspension as discussed above, a read-write head, and a base plate which mounts the suspension to an actuator arm is sometimes called a suspension assembly a head suspension assembly (HSA). A base plate is sometimes called a mount plate, mounting plate, or clad arm.

The load beam is a major arm-like part of the suspension which forms part of its structural backbone. An actuator arm supports the load beam at the load beam's proximal end. The term "load beam" refers to a structure which may be unitary or may be composed of separately formed parts which are later affixed to one another.

The gimbal is held by the load beam over the disk. The gimbal retains the read-write head in a precise position near the load beam distal end while allowing the read-write head to pitch and roll slightly. A gimbal can be an integrally formed portion of a load beam, or it can be a separately formed part.

The read-write head, also referred to as a head or a slider, contains the read-write transducer circuitry upon its proximal end. The slider surface facing the disk is designed and reactive-ion etched to define an aerodynamic pattern typically comprising rails that, in conjunction with the spinning disk, generate a positive pressure thereby lifting the slider from the spinning disk surface. The aerodynamic pattern of protrusions on the slider creates the air bearing surface (ABS) which enables the slider to fly at a constant height close to the disk during operation of the disk drive. The resultant boundary layer of air is commonly called an air bearing. The gram force of the load beam pushes the slider toward the disk while the air bearing of the disk pushes away until an equilibrium position is reached. The equilibrium position is designed to be close enough to the disk so that the slider's read-write circuitry can interact with the disk but far enough away to prevent mechanical contact.

A flexure carries the data signals to and from the read-write head. The flexure typically includes a support layer such as stainless steel, an insulating layer such as polyimide, electrical signal conductors which are typically copper, and a cover coating. The flexure may be referred to as a wiring layer or a circuit or one of several branded terms, i.e. Integrated Lead Suspension (ILS), Flex On Suspension (FOS), Integrated Lead Flexure (ILF), Electrical Lead Suspension (ELS), or Additive Circuit Gimbal (ACG). The flexure electrically connects the read-write head, located at the distal end of the suspension, to an actuator flex. The actuator flex, sometimes referred to as a flexible printed circuit (FPC), connects the flexure to a control circuit board mounted on the base of the disk drive. An electrical interconnect formed by the conductors, sometimes called an electrical lead, is supported by the flexure. The electrical interconnect carries electrical signals from the read-write head that are read from the disk across the suspension to the control circuit board. The flexure also carries electrical signals to be written to the disk from the control circuit board across the suspension to the read-write head. The flexure can be integrally formed on a load beam.

Many current hard disk drive flexures use flying lead features (i.e., with no ground plane backing behind bond pads) to make electrical connections between the flexure and the actuator flex. This design has worked successfully for a number of years because the design is relatively easy to bond. However, the impedance of the flying leads has been relatively poorly matched to read-write head impedance because there is no ground plane under the flying leads. Pad sizes and pitch are fixed based on mechanical requirements.

Newer designs being developed in the hard disk drive industry are eliminating flying lead features and requiring hard disk manufacturers to develop single sided bond pad processes to allow the use of thinner copper flexure constructions. As newer designs with lower and tighter impedance requirements are required to achieve higher flexure bandwidths, the impedance discontinuity within the flexure is becoming a larger issue. Waveforms of circuits having fast switching speed are more susceptible to distortion from the signal line impedance than are waveforms of slower switching speed circuits.

To maximize flexure bandwidth, electrical discontinuities within the flexure are minimized by improved impedance matching. A typical method to match impedance in the flexures is to change the trace width and spacing to match the impedance target of the design. Unfortunately, this standard technique generally cannot be used on the bond pad structures, because the pad size and pitch of the pads is controlled by the bonding technology. Typical bond pad size seen in the industry today is 200-300 micron (μm)×600-800 μm with a bond pad pitch in the 500-800 μm range. These sizes are typically driven by hard drive manufacturer requirements and are not adjustable without greatly impacting the bonding process.

U.S. Pat. No. 5,608,591 to Klaassen discloses a method of minimizing impedance discontinuities in a flexure at a bond pad by removing two large sections of back plane behind around the bond pad, as in the reference's FIGS. 20 and 21. Unfortunately, the removal of such large sections of back plane results in a bond pad which is structurally similar to a flying lead. The bond pad is less supported and thus less compatible with single sided bond pad processes. Also, mini-discontinuities of capacitance are formed.

U.S. Pat. No. 6,891,700 to Shiraishi et al. also discloses a method of minimizing impedance discontinuities in a flexure at a bond pad by forming via holes in the back plane behind the bond pads, as in the reference's FIGS. 3, 5, and 7. The via holes allow increased support of the pads but are limited in how much they can alter impedance.

SUMMARY OF THE INVENTION

To address bond pad impedance problems, application of a ground plane under the bond pads with varying, distributed surface area coverage is proposed. Also, application of a ground plane under the bond pads having slits between the read pads and separate slits between the write pads with differing slit widths is proposed.

In a first aspect, therefore, the invention is of a disk drive flexure including a bond pad disposed over a portion of the ground plane, the portion of the ground plane disposed vertically underneath the bond pad defining a bond pad ground plane area, the ground plane portion having a pattern of voids, where the pattern of voids improves impedance matching associated with a circuit connected to the bond pad. The voids within the pattern are preferably equally sized, regularly spaced, and arranged in a plurality of rows and plurality of columns within the bond pad ground plane area, with each individual void having an area that is preferably less than about 10% of the area of the bond pad.

In a second aspect, the invention is of a disk drive flexure including a read circuit, a write circuit, a plurality of read bond pads associated with the read circuit, a plurality of write bond pads associated with the write circuit, the write bond pads situated near the read bond pads, and a ground plane underneath and in close proximity to the read and write bond pads, the ground plane having a first continuous slot extending underneath the read bond pads and a second continuous slot extending underneath the write bond pads, the first and second slots having different widths such that an impedance of the read bond pads is different from an impedance of the write bond pads.

In a third aspect, the invention is of a disk drive flexure including a read circuit having bond pads, a write circuit having bond pads situated near or near the read circuit bond pads, and a ground plane underneath and in close proximity to the read and write circuit bond pads, where the ground plane has a first at least one void extending underneath the read circuit bond pads and a second at least one void extending underneath the write circuit bond pads, the voids underneath the read and write circuit bond pads having different areas such that an impedance of the read circuit bond pads is different from an impedance of the write circuit bond pads.

Exemplary embodiments of the invention will be further described below with reference to the drawings, in which like numbers refer to like parts.

DETAILED DESCRIPTION OF THE PREFERRED EMBODIMENTS

Figure 1:
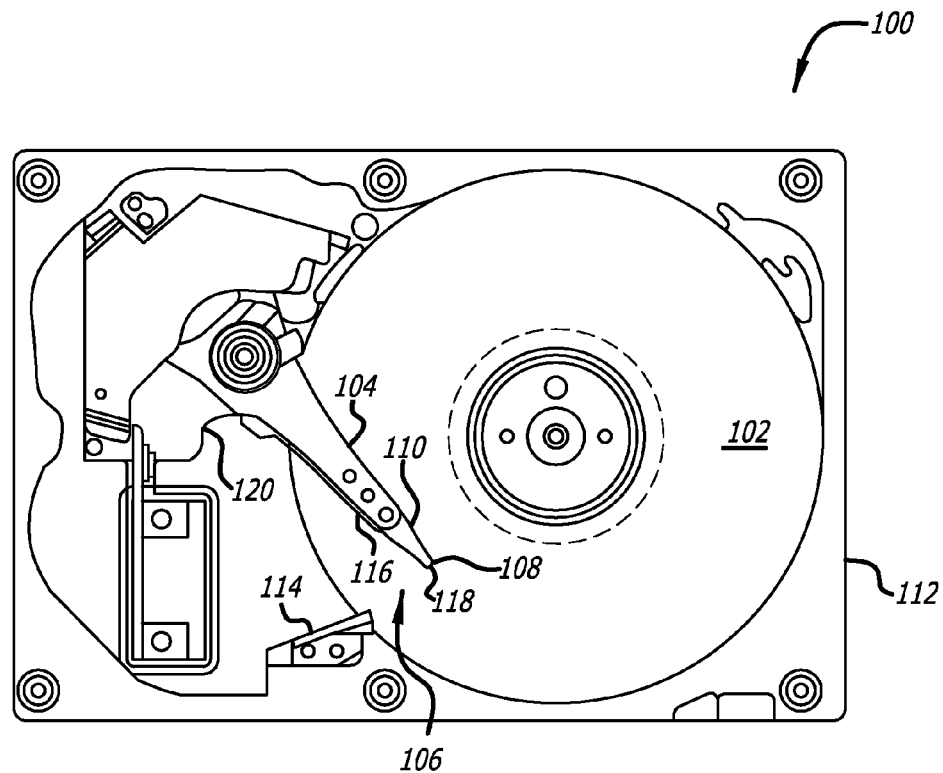
FIG. 1 is a plan view of the inside of a hard disk drive according to an embodiment of the present invention.

With reference to FIG. 1, a typical hard disk drive 100 includes at least one data storage disk 102 (e.g., one, two, three, or more disks), at least one actuator arm 104 (e.g., one, two, three, or more actuator arms), and at least one head suspension assembly (HSA) 106 (e.g., one, two, three, or more head suspension assemblies). Each HSA 106 is composed of a slider 108 and a suspension 110. FIG. 1 illustrates a state of hard drive 100 in which slider 108 is located for operation to access disk 102. Slider 108 is held by suspension 110 which in turn is supported by actuator arm 104. Actuator arm 104 is rotatably held to base 112 and typically rotated by a voice coil motor. A ramp 114 is disposed close to the outer circumference of disk 102 to have a withdrawal position to which slider 108 is unloaded from above the surface of disk 102 when rotation of disk 102 is stopped or in other situations. A tab 118 is formed at the distal end of suspension 110 and slides over a ramp 114 during loading/unloading. Slider 108 is electrically connected by a flexure 116 to an actuator flex 120. This diagram, as well as other diagrams provided herein, is merely an example, which should not unduly limit the scope of the claims herein. One of ordinary skill in the art would recognize many other variations, modifications, and alternatives.

Figure 2:
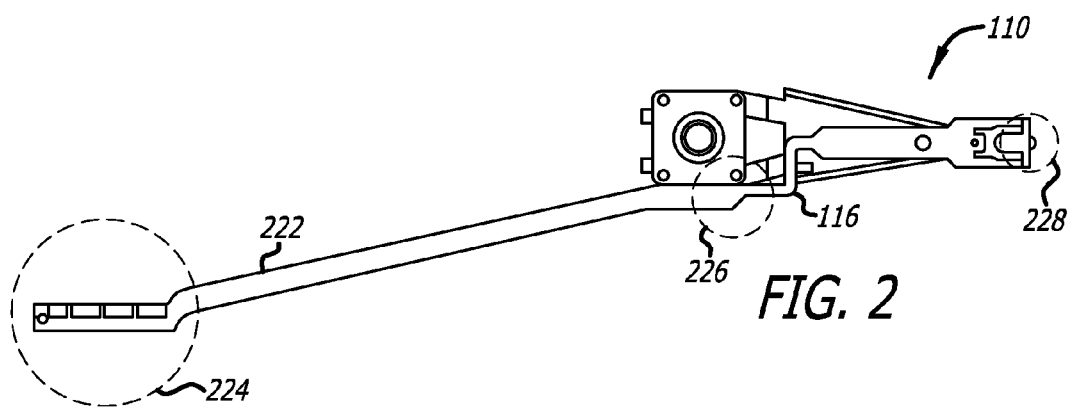
FIG. 2 is a plan view of a suspension and flexure according to an embodiment of the present invention.

With reference to FIG. 2, suspension 110 includes flexure 116 which can be integrally formed on suspension 110. Flexure 116 can include a flexure tail 222. Flexure 116 includes electrical leads which have bond pads for internal and external connections. Bond pads are located in multiple areas on the flexure, including actuator flex bond pad region 224, flexure tail bond pad region 226, and gimbal bond pad region 228.

The conductive paths of the electrical leads form circuits. The circuits include a read circuit which carries signals from the read-write head to an actuator flex, and a write circuit which carries signals from the actuator flex to the read-write head. Typically, each circuit is a pair of conductive paths; however, more than two conductive paths can be included in a circuit.

Figure 3A:
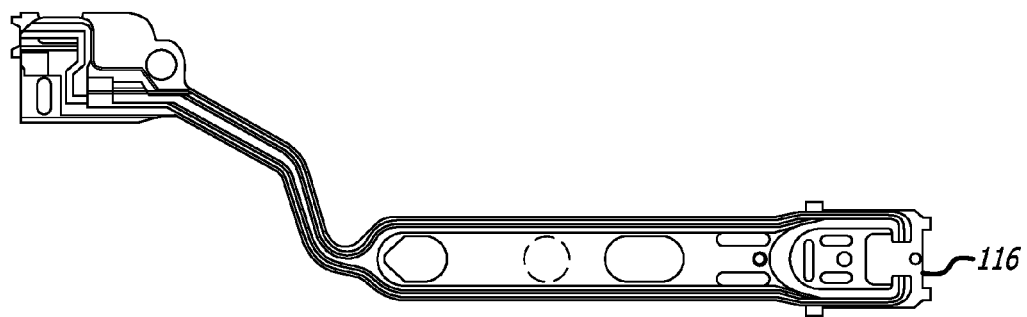
FIG. 3A is a plan view of the underside of the flexure of FIG. 2 without its flexure tail.
Figure 3B:
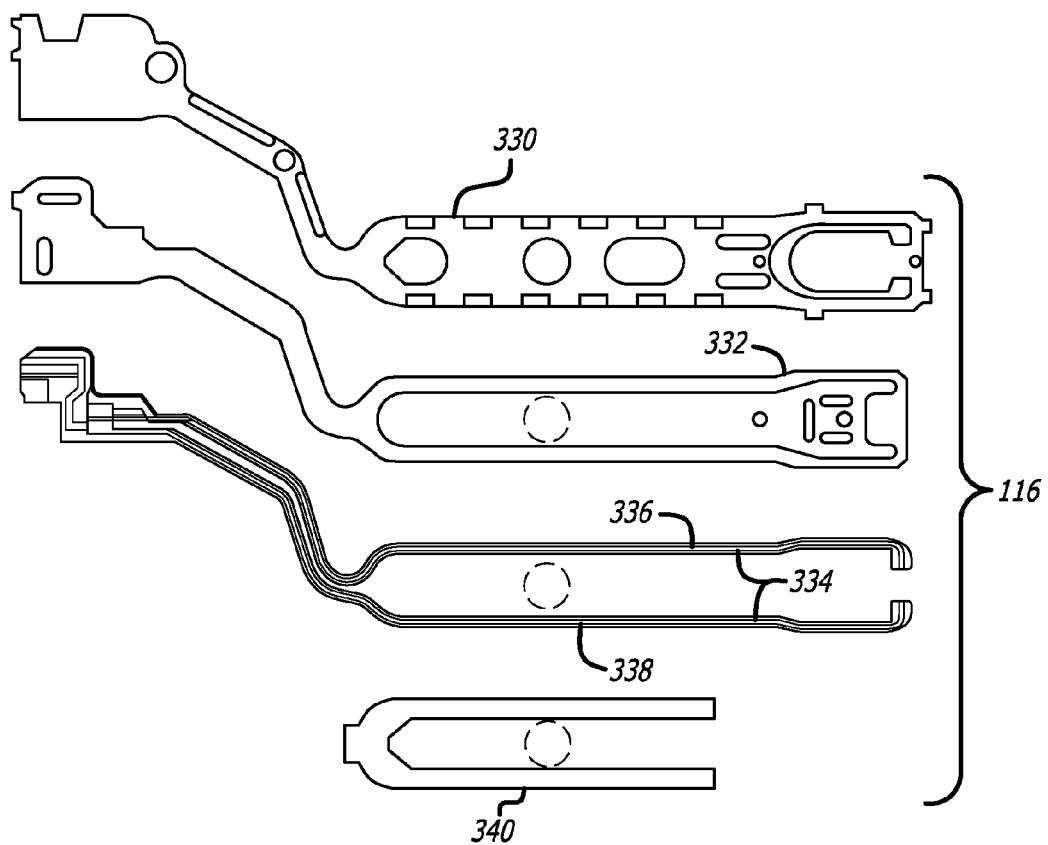
FIG. 3B is an exploded plan view of the flexure of FIG. 3A.

With reference to FIGS. 3A-3B, flexure 116 includes a ground plane 330. A ground plane can be referred to as a backing Ground plane 330 can be comprised of any conductive material, which is typically stainless steel but can alternatively be copper or aluminum or possibly other conductive material. On top of ground plane 330 is disposed an insulating layer 332, such as plastic insulating laminated or deposited polyimide film. On top of insulating layer 332, trace conductors 334 are disposed. Areas underneath trace conductors 334 which are devoid of an insulating layer 332 and ground plane 330 are sometimes called flying leads. Trace conductors define read circuit 336 and write circuit 338, as well as other circuits such as grounding and shielding circuits. An optional cover layer 340 covers trace conductors 334. Ground plane 330 is typically grounded and electrically isolated from trace conductors 334.

With the implementation of the bond pad designs of the present invention, ground plane structures are modified to adjust the impedances of the circuits at the bond pads. More specifically, by modifying the percentage of ground plane versus no ground plane underneath each bond pad, the impedance of the circuit at the bond pad can be adjusted to the desired value. Generally speaking, the impedance at the bond pad will be adjusted to match the impedance of the rest of the circuit including the read or write transducer and the signal traces which electrically connect the bond pad to the transducer. A bond pad with no ground plane underneath it will have maximum impedance. A bond pad with a solid ground plane underneath it, i.e., one in which all of the area underneath the bond pad and near its edges constitute ground plane, will have minimal impedance.

The impedances of the signal conductors leading to the bond pads can also be varied in a similar manner, i.e., by forming a pattern of voids in the ground plane underneath the read and write pair signal traces, with the sizes and frequencies of the voids defining the percentage of ground plane underneath each signal trace, in order to adjust the impedances of the signal traces to the desired values. This technique can be used in conjunction with other known techniques for varying the impedances of the signal traces, including varying the spacings of the signals within a signal pair, varying the distance from the ground plane, and selecting an insulating layer having a desired dielectric constant.

With reference to FIGS. 4A-4D, a terminal area 442 has trace conductors 334 which form bond pads 444. Read bond pads 446 are associated with read circuit 336, and write bond pads 448 are associated with write circuit 338. FIGS. 4A-4D illustrate different embodiments of the invention, in which the voids underneath the bond pads have the shapes of diamonds, squares, triangles, and circles, respectively. By adjusting the sizes of the voids, and by adjusting the distances between voids, the percentage of ground plane underneath each pad can be adjusted as desired to create the desired bond pad impedance. The pattern of voids is preferably a regular pattern of voids, having a plurality of rows and a plurality of columns underneath each bond pad, with the voids regularly spaced in both the x and y directions. The individual voids are preferably relatively small relative to the bond pad. Each individual void preferably has an area that is less than 10% of the total area underneath its associated bond pad. The individual voids are preferably even smaller still, such as less than 1%, less than 2%, or less than 5% of the area underneath each bond pad. Preferably there are at least 3 voids underneath each bond pad, and more preferably still at least 5 voids underneath each bond pad, and more preferably still at least 10 voids underneath each bond pad, preferably with each such void being disposed entirely underneath the bond pad. The pattern of voids may be limited to being disposed entirely underneath the bond pad, or the pattern may extend slightly beyond the outer peripheral boundary of the bond pad, or may extend even farther than that.

As used herein, the term "void" in a ground plane means merely an absence of conductive ground plane material; the void may be filled with non-conductive material such as an insulating material, or it may be filled with air, or with nothing.

Additionally, as used herein, unless numerically defined a bond pad impedance will be understand as "generally matching" an impedance of a signal transducer or other electrical component to which the bond pad is electrically connected if the bond pad has an impedance that matches the electrical component to within a level that electrical engineers would consider to be satisfactory impedance matching. Preferably the impedances are matched to within 50%, and more preferably to within 20%, and more preferably to within 10%, and more preferably still to within 5%.

Figure 4A:
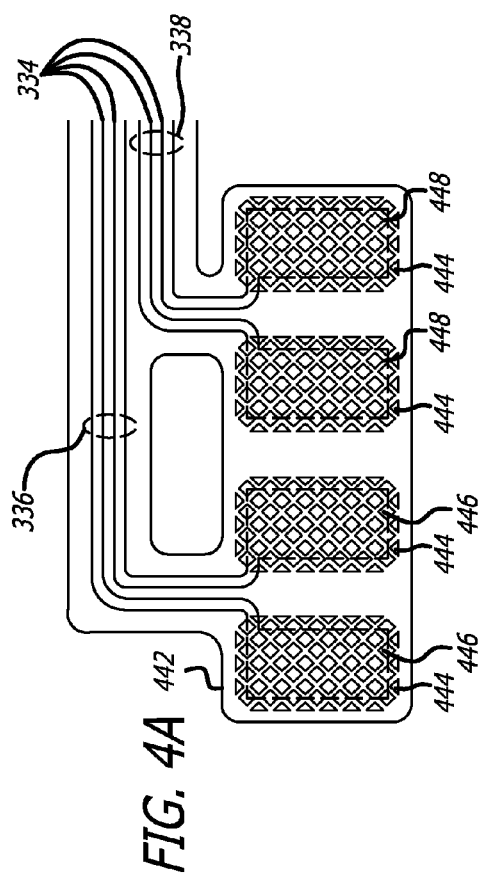
FIGS. 4A-4D are plan views of bond pads according to embodiments of a first aspect of the present invention.
Figure 4C:
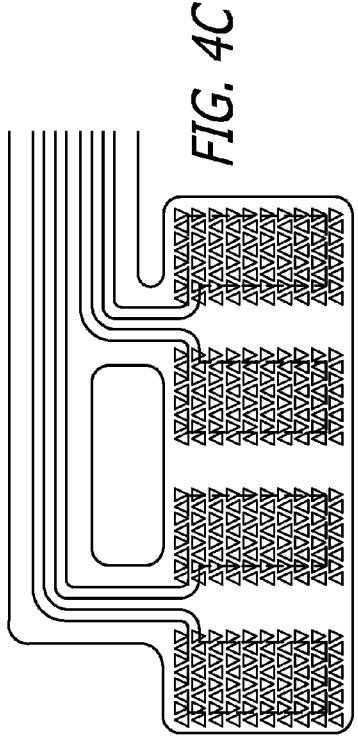
Figure 4B:
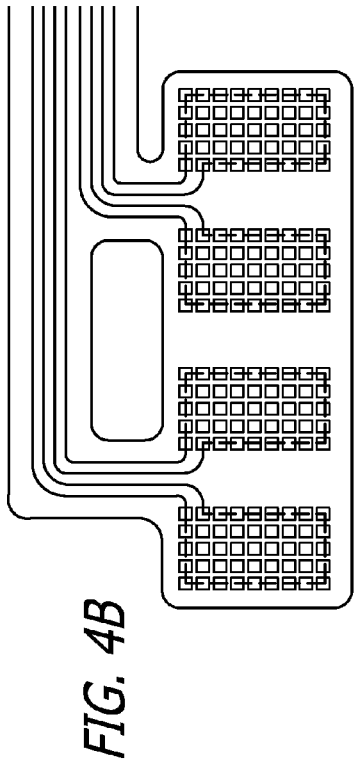
Figure 4D:
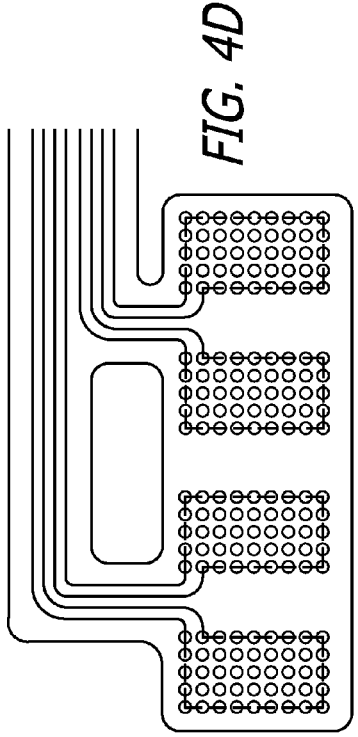

Although not shown explicitly in FIGS. 4A-4B, the pattern of voids can be adjusted so that a different pattern of voids lies underneath the read bond pads than underneath the write bond pads, with an impedance target of 100 ohms for the read bond pad pair and 50 ohms for the write bond pair, or whatever the impedances are for the particular read transducer and write transducer used within that suspension. The void pattern can be adjusted by making the individual voids in the conductive material larger or smaller, or farther apart or closer together. It is, of course, not strictly necessary that the pattern defined by the void be a completely regular pattern, and some irregularities may exist with the pattern still falling within the spirit of the invention. It is believed, however, that a generally regular pattern of voids will be preferred because a regular pattern is believed to achieve the most consistent impedance across the surface of the bond pad. Additionally, it is believed that it will be preferred to make the voids relatively small in size and large in number, because it is believed that such a pattern of voids will render the resulting impedance less sensitive to layer mis-registration.

Figure 5:
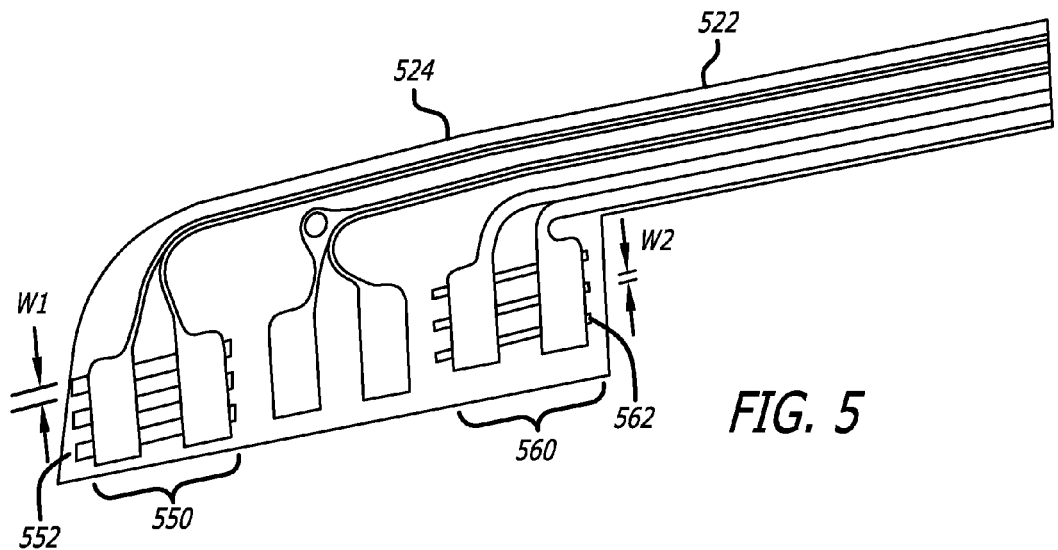
FIG. 5 is an axonometric projection of a flexure tail according to an embodiment of a second aspect of the present invention.

FIG. 5 shows a simplified flexure tail 522 according to another embodiment of the invention. Flexure tail 522 includes a bond pad region 524. Located in bond pad region 524 are a write bond pair 550 and a read bond pair 560. Located underneath write bond pair 550, and separated from the bond pads by the usual insulating layer such as polyimide, is a ground plane having voids in the form of slots 552 underneath, the write pair ground plane slots 552 having width w1. Similarly, located underneath read bond pair 560, and separated from the bond pads by the usual insulating layer, is a ground plane having voids in the form of slots 562 underneath, the write pair ground plane slots 552 having width w2. As illustrated, the slots define patterns of regularly spaced voids underneath the respective bond pad pairs, with three slots underneath each ground pad pair. The slots extend continuously underneath each bond paid pair, i.e., the slots under the first bond pad within a bond pad pair join with the slots under the second bond pad within the bond pad pair. The widths of write pad ground plane slots 552 is greater than the widths of read pad ground plane slots 562, resulting in the read bond pad pair presenting a greater terminal impedance at the ends of the read signal traces than at the ends of the write signal traces. In other embodiments, the slots need not extend continuously underneath both pads within a bond pad pair, and the slots need not be necessarily regularly spaced.

Figure 6:
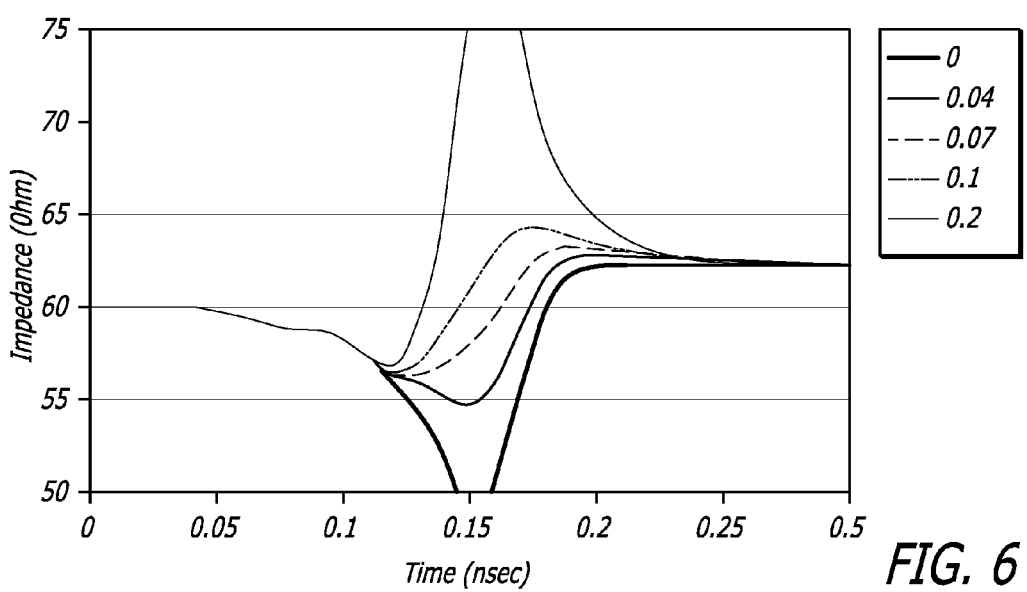
FIG. 6 is plot of time-domain reflectometer (TDR) results from an electrical modeling simulation of the flexure tail in FIG. 5.

FIG. 6 is a plot of a time domain reflectometer results (TDR) from an electrical model of the bond pads of FIG. 5, as a result of slot width. In the model, the slots were spaced at 200 μm pitches with a slot width of W. The slot width W was varied from 0 (solid ground plane) to 200 μm wide (no ground plane). The width was varied until the slot width was identified that produced the smallest reflection (best impedance match) for a 60 ohm signal trace impedance. A 70 μm slot width produced the optimal impedance match, i.e., the smallest impedance discontinuity, the smallest signal reflection, and the highest predicted flexure bandwidth. The solid ground plane (W=0 μm) and no ground plane (W=200 μm) model runs created very large impedance discontinuities, which would reduce flexure bandwidth and performance. By adjusting the percentage of ground plane underneath the bond pad, the impedance of the bond pad can be more accurately matched to the impedance of the signal traces and the impedance of the read or write transducer at the other end of the trace, thus producing cleaner signal transmission. At 70 μm wide, each slot in the simulation had a width that was less than 20% of the smallest width of the read and write bond paid pairs.

In the foregoing discussion, the ground plane has been referred to as lying "under" or "underneath" the signal traces and bond pads. It will be appreciated that terms such as "under" and "over" are terms that, in one sense, depend upon the viewpoint of the observer and the orientation of the suspension, but that such terms should be interpreted in their broad sense to cover a structure having the features disclosed according to the invention regardless of how the suspension is oriented or viewed by an observer. Additionally, it will be understood that the ground planes are "under" or "underneath" the bond pads in the sense of being vertically under, not directly under and abutting against so as to be in electrical contact. As will be understood, the ground plane is typically electrically isolated from the bond pads by an insulating material such as polyimide.

It will be appreciated that the term "present invention" as used herein should not be construed to mean that only a single invention having a single essential element or group of elements is presented. Similarly, it will also be appreciated that the term "present invention" encompasses a number of separate innovations which can each be considered separate inventions. Although the present invention has thus been described in detail with regard to the preferred embodiments and drawings thereof, it should be apparent to those skilled in the art that various adaptations and modifications of the present invention may be accomplished without departing from the spirit and the scope of the invention. For example, the invention could be applied to circuits other than flexure circuits in a hard disk drive, in order to improve impedance matching in those other applications. Accordingly, it is to be understood that the detailed description and the accompanying drawings as set forth hereinabove are not intended to limit the breadth of the present invention, which should be inferred only from the following claims and their appropriately construed legal equivalents.

What is claimed is:

1. A disk drive flexure comprising a ground plane, at least one signal conductor, a bond pad electrically connected to the signal conductor, and an insulating layer separating the bond pad from the ground plane, wherein:
   the bond pad is disposed over a portion of the ground plane defining a bond pad ground plane area;
   the bond pad ground plane area has a pattern of voids therein, the pattern of voids causing the bond pad to exhibit an electrical impedance which generally matches an impedance of a signal transducer electrically connected to said bond pad through said signal conductor.

2. The flexure of claim 1 wherein each void within the pattern is smaller than 10% of the bond pad.

3. The flexure of claim 2 wherein said pattern of voids comprises at least 5 voids disposed entirely underneath said bond pad.

4. The flexure of claim 1 wherein the pattern comprises a plurality of rows and a plurality of columns.

5. The flexure of claim 1 wherein the voids are equally sized.

6. The flexure of claim 1 wherein the voids are regularly spaced.

7. The flexure of claim 1 wherein the pattern is a regular pattern.

8. The flexure of claim 1 wherein each void in the pattern has a shape selected from the group consisting of square, diamond, triangle, and circle.

9. The flexure of claim 8 further comprising:
   a second bond pad having a second pattern of voids in an associated ground plane underneath the second bond pad; and wherein:
   said bond pad constitutes a first bond pad and said pattern of voids constitutes a first bond pad pattern; and
   said first pattern of voids is different from said second pattern of voids.

10. The flexure of claim 1 wherein the pattern is entirely disposed underneath the bond pad.

11. A hard disk drive including the flexure of claim 1.

12. A disk drive flexure comprising:
    a read circuit;
    a write circuit;
    a plurality of read bond pads associated with the read circuit;
    a plurality of write bond pads associated with the write circuit; and
    a ground plane underneath the read and write bond pads, the ground plane having a first slot extending underneath the read bond pads and a second slot extending continuously underneath the write bond pads, the first and second slots having different widths.

13. The flexure of claim 12 wherein the ground plane has additional continuous slots extending underneath the read bond pads and has further additional continuous slots extending underneath the write bond pads, the additional slots under the read bond pads forming a regularly spaced pattern of slots thereunder, and the additional slots under the write bond pads forming a regularly spaced pattern of slots thereunder.

14. The flexure of claim 12 wherein the first and second slots join.

15. The flexure of claim 12 wherein the ground plane supports the read and write bond pads.

16. The flexure of claim 12 wherein the slot widths are less than 20% of the smallest width of the read and write bond pads.

17. The flexure of claim 12 wherein the ground plane comprises a material selected from the group consisting of stainless steel, copper, and aluminum.

18. A hard disk drive comprising the flexure of claim 12, and further comprising a slider in close proximity to a data storage disk, the flexure connecting to the slider.

19. A disk drive flexure comprising:
    a read circuit having bond pads;
    a write circuit having bond pads; and
    a ground plane underneath the read and write circuit bond pads, wherein the ground plane has a first at least one void disposed underneath the read circuit bond pads and a second at least one void disposed underneath the write circuit bond pads, the first and second at least one voids having different areas.

20. The disk drive flexure of claim 17 wherein:
    said first at least one void in the ground plane causes the read circuit bond pad to have a read bond pad impedance associated therewith;
    said second at least one void in the ground plane causes the write circuit bond pad to have a write impedance associated therewith; and
    wherein said read bond pad impedance is higher than said write bond pad impedance.

* * * * *

UNITED STATES PATENT AND TRADEMARK OFFICE
CERTIFICATE OF CORRECTION

| | |
|---|---|
| PATENT NO. | : 8,004,798 B1 |
| APPLICATION NO. | : 12/397496 |
| DATED | : August 23, 2011 |
| INVENTOR(S) | : Christopher Gene Dunn |

It is certified that error appears in the above-identified patent and that said Letters Patent is hereby corrected as shown below:

In claim 20, column 8, line 53, delete "17" and insert -- 19 --.

Signed and Sealed this
Eighteenth Day of October, 2011

David J. Kappos
*Director of the United States Patent and Trademark Office*